Figure 4B:
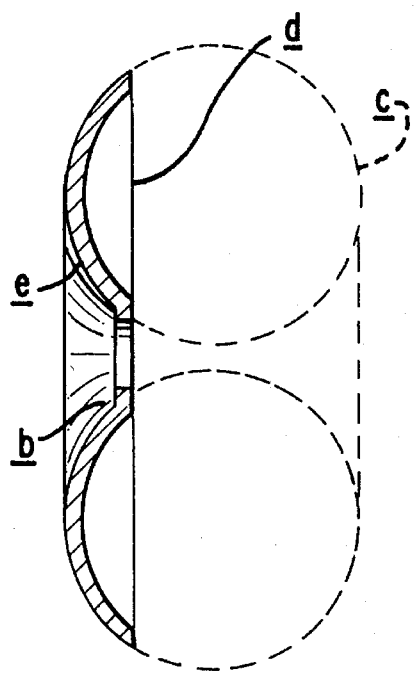

United States Patent [19]

Javerlhac

[11] Patent Number: 5,620,055
[45] Date of Patent: Apr. 15, 1997

[54] PLOW DISK OF THE TYPE INTENDED TO BE MOUNTED FREE IN ROTATION ON A SHAFT INTEGRAL WITH THE FRAME OF A PLOW

[76] Inventor: Jean-Charles Javerlhac, Les Rosiers - Guimps, 16300 - Barbezieux, France

[21] Appl. No.: 524,155

[22] Filed: Aug. 16, 1995

Related U.S. Application Data

[63] Continuation of Ser. No. 104,476, Jul. 28, 1993, abandoned, which is a continuation of Ser. No. 773,880, filed as PCT/FR90/00313, May 2, 1990, published as WO90/13217, Nov. 15, 1990, abandoned.

[30] Foreign Application Priority Data

May 2, 1989 [FR] France .................................. 89 05815
Nov. 27, 1989 [FR] France .................................. 89 15558

[51] Int. Cl.⁶ .................................................. A01B 15/16
[52] U.S. Cl. ...................................... 172/604; 172/532
[58] Field of Search ............................ 172/604, 15, 531, 172/558, 532, 163, 167, 168, 169; 111/163, 167–169; 56/1, 255, 256, 295

[56] References Cited

U.S. PATENT DOCUMENTS

| | | | |
|---|---|---|---|
| Re. 9,169 | 4/1880 | Johnson | 172/604 X |
| 380,422 | 4/1888 | Clark | 111/169 |
| 536,094 | 3/1895 | Newton | 172/604 |
| 672,536 | 4/1901 | Newton | 172/604 |
| 882,353 | 3/1908 | Speirs | 172/604 |
| 1,060,280 | 4/1913 | Olson | 172/604 |
| 1,113,241 | 10/1914 | Niesz | 172/604 |
| 1,158,110 | 10/1915 | Cook | 172/604 |
| 1,214,882 | 2/1917 | Bessant . | |
| 2,034,579 | 3/1936 | Hurtig . | |
| 2,277,622 | 3/1942 | White | 111/169 |
| 2,528,897 | 11/1950 | Mayfield | 56/295 |
| 2,704,970 | 3/1955 | Greaves | 111/169 |
| 2,746,371 | 5/1956 | Coolk | 172/604 |
| 2,805,534 | 9/1957 | Robertson | 172/558 |
| 2,949,968 | 8/1960 | Stoner | 172/558 |
| 3,005,501 | 10/1961 | Frank | 172/604 X |
| 3,621,922 | 11/1971 | Hinken | 172/604 X |

FOREIGN PATENT DOCUMENTS

| | | | |
|---|---|---|---|
| 0162197 | 11/1985 | European Pat. Off. . | |
| 455691 | 8/1913 | France . | |
| 1024964 | 6/1955 | France | 172/604 |
| 1187337 | 9/1959 | France . | |
| 698859 | 11/1965 | Italy | 172/604 |
| 1033017 | 8/1983 | U.S.S.R. . | |
| 832431 | 4/1960 | United Kingdom | 172/604 |
| 2023390 | 1/1980 | United Kingdom | 56/295 |
| 2122062 | 1/1984 | United Kingdom | 172/604 |

*Primary Examiner*—Terry Lee Melius
*Assistant Examiner*—Christopher J. Novosad
*Attorney, Agent, or Firm*—Hoffman, Wasson & Gitler

[57] ABSTRACT

This invention relates to a Plow Disk intended to be mounted with several disks of the same nature, free in rotation around a shaft integral with the frame of a plow, the shaft being parallel to the ground but inclined in relation to the direction of advance of the plow so as to impart a rotation movement to the disks during displacement of the plow, the periphery of the disk seen parallel to its axis of rotation exhibiting the shape of the blades.

10 Claims, 5 Drawing Sheets

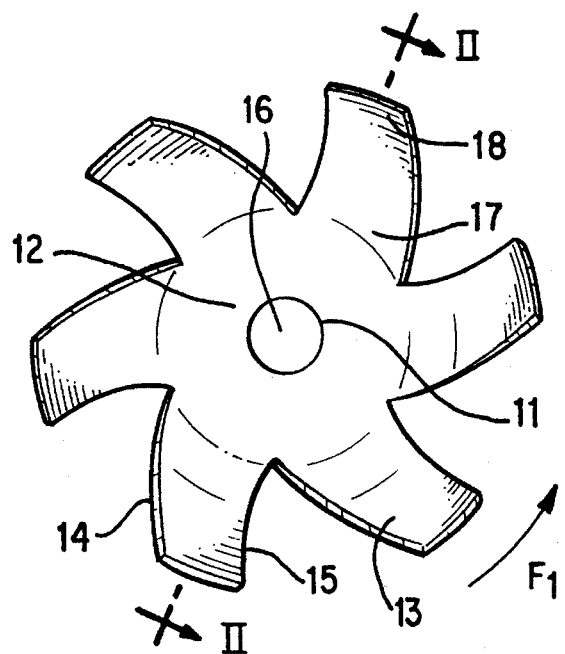
FIG.1
 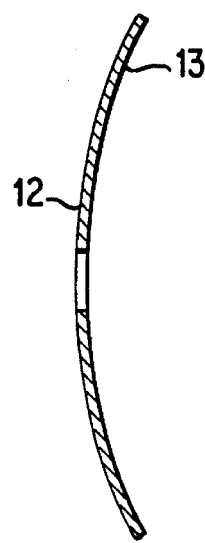 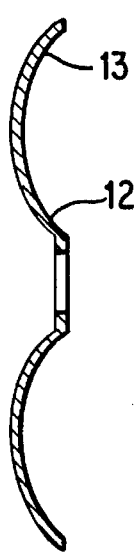 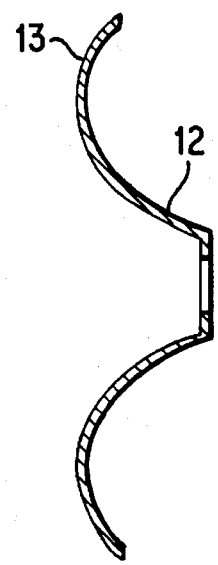
FIG.2  FIG.3  FIG.4  FIG.5

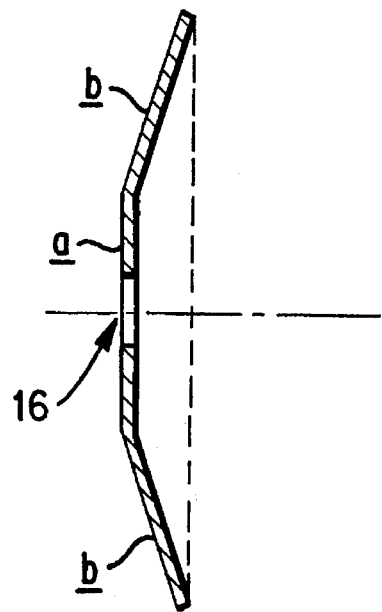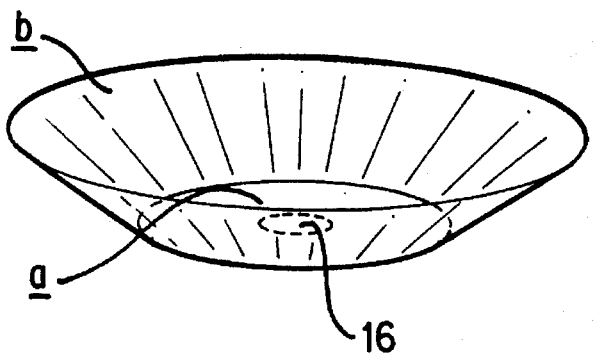
FIG. 2B  FIG. 2A
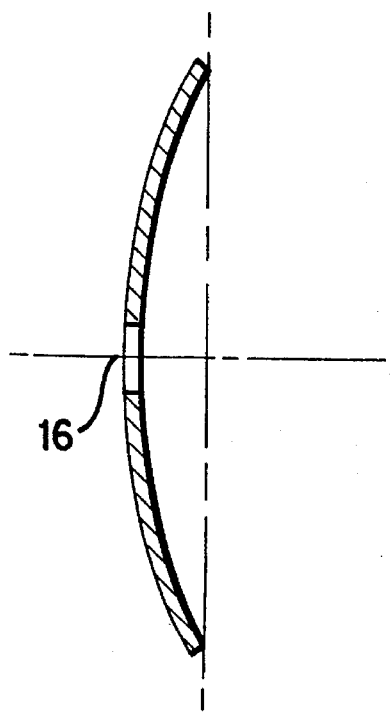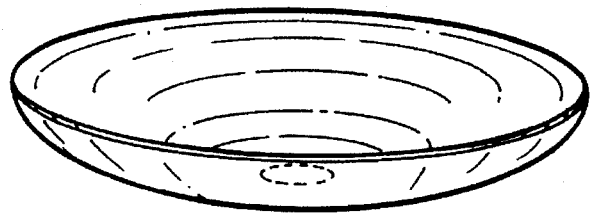
FIG. 3B  FIG. 3A

PLOW DISK OF THE TYPE INTENDED TO BE MOUNTED FREE IN ROTATION ON A SHAFT INTEGRAL WITH THE FRAME OF A PLOW

This application is a continuation of application Ser. No. 08/104,476 filed on Jul. 28, 1993, now abandoned; which is a continuation of Ser. No. 08/773,880, filed as PCT/FR90/00313, May 2, 1990 published as WO90/13217, Nov. 15, 1990, now abandoned.

This invention relates to a plow disk intended to be mounted with several other disks of the same nature, free in rotation around a shaft integral with the frame of a plow, said shaft being parallel to the ground but inclined in relation to the direction of advance of the plow so as to impart a rotation movement to the disks during the displacement of the plow, the periphery of the disk seen parallel to its axis of rotation exhibiting the shape of blades.

These disks of known type are generally in the shape of a portion of a sphere of steel centered on their axis of rotation. They therefore form a cup at the bottom of which is their hub and thereby cause a partial turning over of the earth during the plowing.

These plow disks as described in document U.S. Pat. No. 2,034,579 comprise notches on their periphery. They are not entirely satisfactory because, on the one hand, they have a tendency to collect and catch on the plants that are growing on the surface of the plowed ground and, on the other hand, the surface of the plowed ground does not always appear with the structure that it is desired to impart to it.

Another drawback of known plow disks of said type resides in the fact that they form a sole in the ground, i.e., they create a sharp separation surface between the part of the ground which is plowed and which is consequently loose, and the unplowed and consequently hard part.

This invention aims particularly at eliminating these drawbacks.

According to the invention, the plow disk is characterized by the fact that the leading edge of the blades progressively rotates about the axis by turning in the direction of rotation of the plow disk during its work.

Preferably, the blades have a width which decreases while moving away from the axis of rotation.

This arrangement exhibits not only the advantage of preventing the formation of a sole because the depth of attack of the ground varies as the advance, but further that of more effectively breaking up the clods of earth.

According to an embodiment of the invention, the generatrix of the plow disk consists of a curve or a concave polygon whose one end is on the periphery of the disk and whose other end is near its center, said generatrix being entirely located on a single side of its tangent which is perpendicular to the axis of rotation of the disk, said tangent being in contact with the generatrix at a point away from its ends. The generatrix of a surface in revolution is the line whose motion generates the surface of revolution. In the present invention, the generatrix of the disk is the half cross-section of said disk with a plane containing the axis of rotation of said disk. In FIGS. 2–5 the cross-section of the disk of FIG. 1 is clearly represented by a plane passing through the center of the disk. In FIG. 2, the cross-section comprises a central part perpendicular to the axis of rotation followed by two inclined parts corresponding to the frustoconical shape of the periphery of the disk. The cross-section of FIG. 3 is substantially curved. Half the cross-sections of FIGS. 4 and 5 are substantially toroidal. In any of the FIGS. 2–5, if one considers a plane located on the left side of the figures, said plane being tangential to the cross-section, it is obvious that any part of the cross-section of the disk is located on the same side of said tangential plane. In FIGS. 2 and 3, the tangential plane meets the cross-section in the vicinity of the center. In FIG. 4, the tangential plane meets the cross-section along a circle which is about half way between the center and the periphery of the disk. In FIG. 5, the tangential plane meets the cross-section along a circle which is closer to the periphery of the disk than to the center of the disk.

This particular shape of the disk makes it possible to increase considerably its diameter while correctly folding back the upper part of the earth which is plowed.

A better release of the plants growing on the surface of the plowed ground also results from it and therefore a better penetration and an easier rotation of the disks which thus work under much better conditions.

The two ends of the concave generatrix of the disk can be found in the same plane but it can be otherwise and according to a preferred embodiment, the end of the generatrix which is located in the vicinity of the axis of the disk is offset to the front in the direction of the advance of the plow.

By way of example, a plow disk according to the invention can be in the form of a surface similar to a torus portion delimited by a plane perpendicular to its axis or preferably by two planes, the plane delimiting the outside periphery of the disk being—in relation to the direction of working—in back of the plane perpendicular to the axis that the internal periphery of the disk delimits in the vicinity of its hub.

This invention also has as its object a plow characterized by the fact that it comprises disks exhibiting the characteristics described above, and more particularly such a plow in which the blades of two adjacent disks are offset angularly by a predetermined value, for example by an angle between about 10° and 30°, and preferably between 15° and 20°.

Other characteristics of the invention are given in the accompanying claims which must be considered as being part of this description.

Figure 4A:
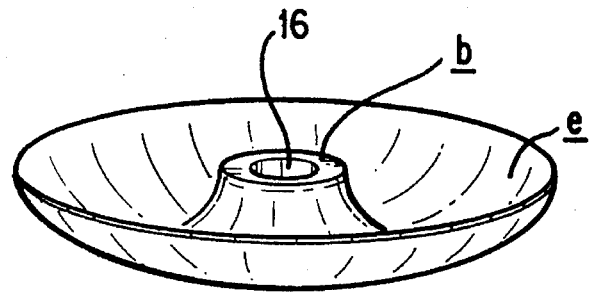
Figure 5B:
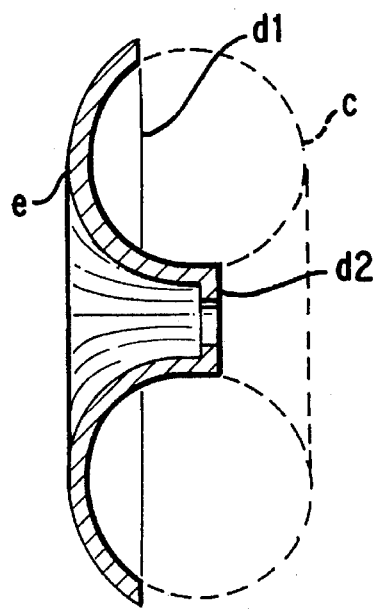
Figure 5A:
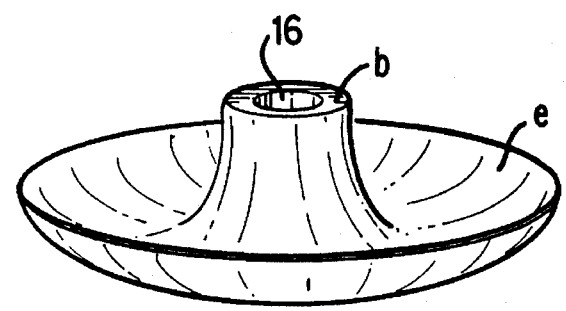
Figure 6:
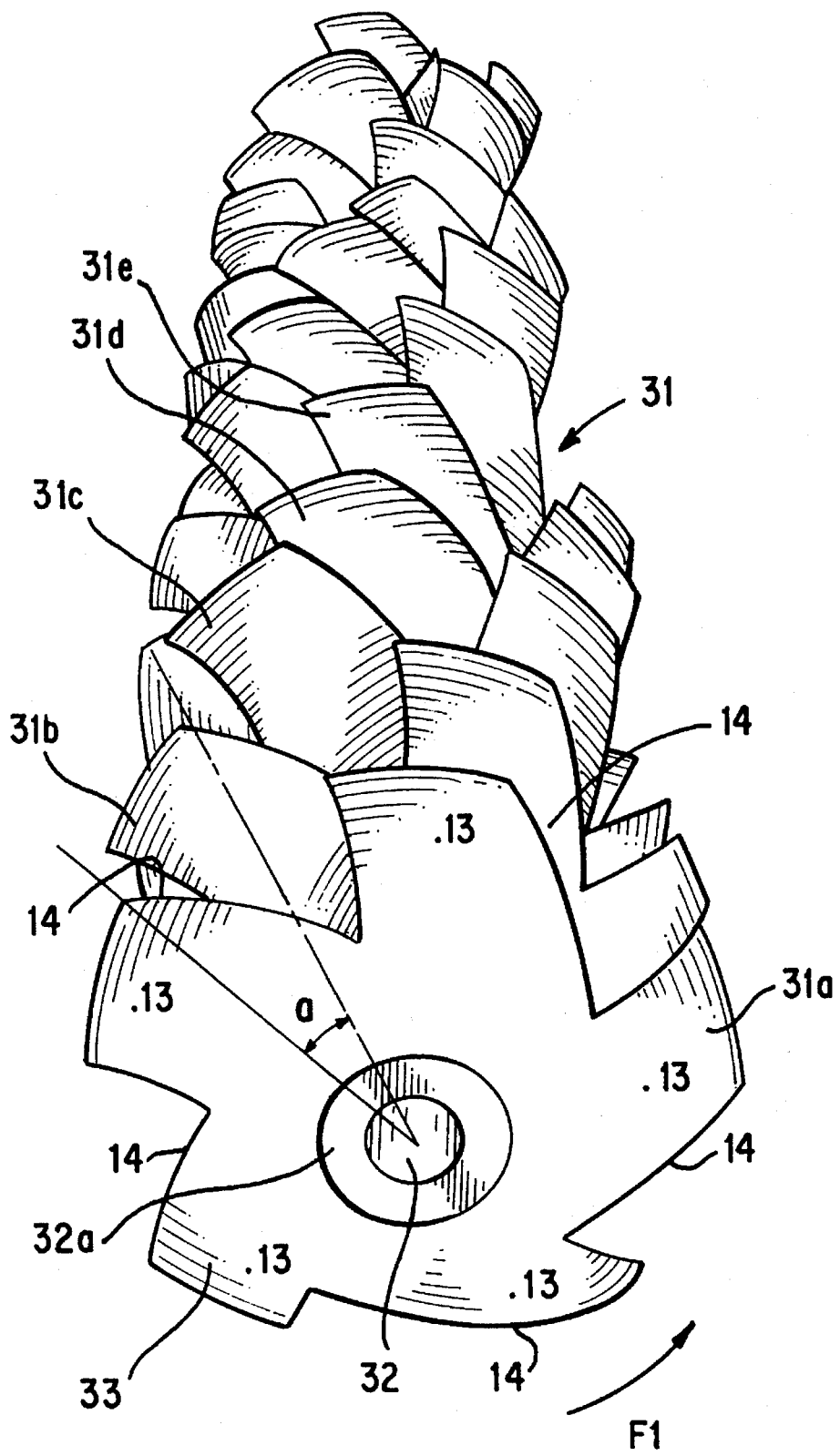

Now, by way of nonlimiting example, some particular embodiments of the invention will be given with reference to the accompanying diagrammatic drawing in which:

FIG. 1 is a view in elevation of an embodiment of the plow disk according to the invention, FIGS. 2A–5A are sections along II—II of four variant embodiments of the disk of FIGS. 1, 2B–5B are perspective views of FIGS. 2A–5A and FIGS. 2–5 are sectional views taken along line II—II of FIG. 1 showing four variant embodiments of the disk, and FIG. 6 represents a plow equipped with disks according to the invention.

Figure 7:
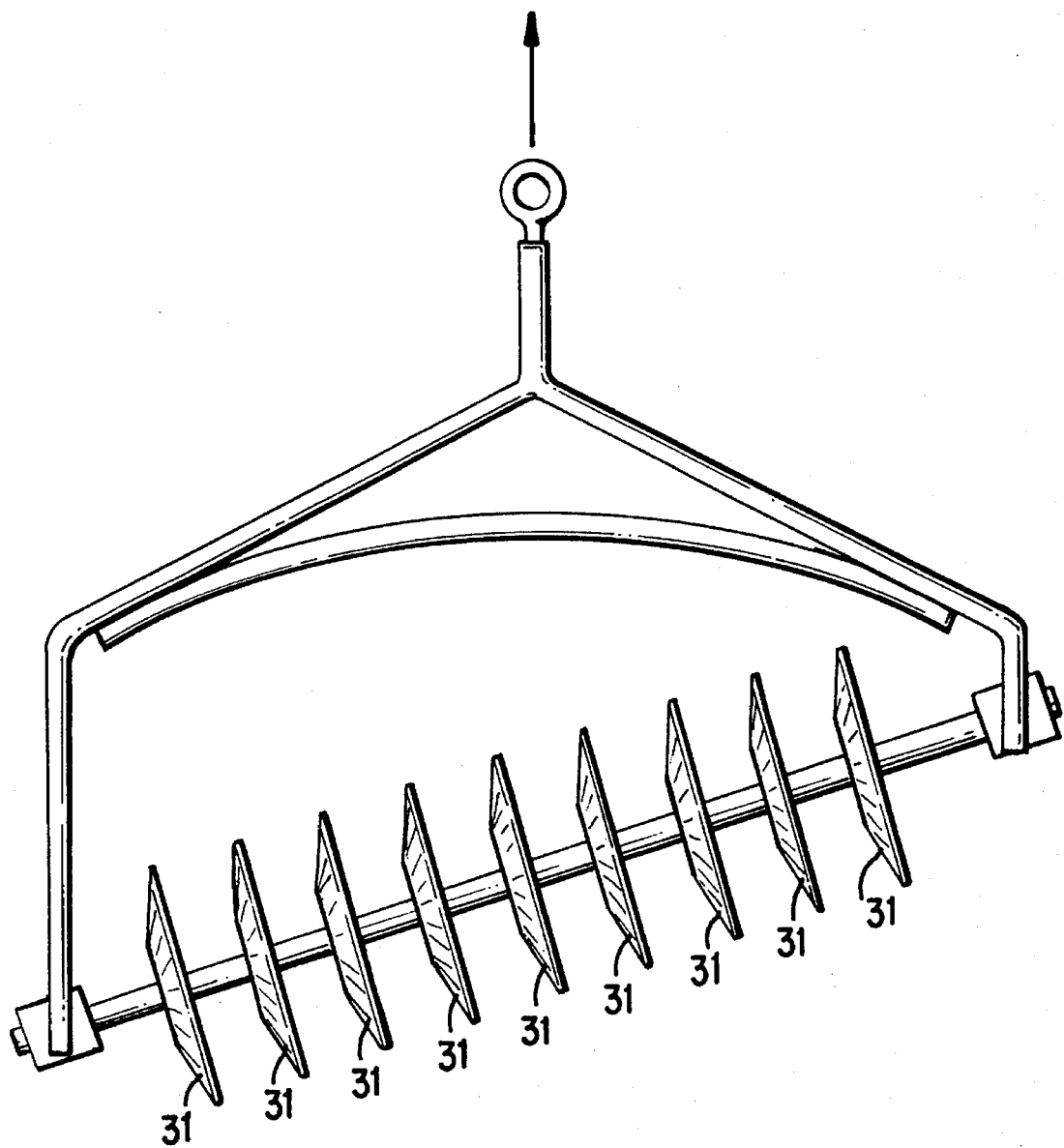

FIG. 7 is a top view of a plurality of disks inverted on a common shaft.

The plow disk of FIG. 1 comprises at its central part a pierced hole (16) making it possible to mount it in the known way on a shaft integral with the frame of a plow, a shaft around which it can freely turn.

In the embodiment described, the plow disk according to the invention comprises a series of blades 13 on its periphery, for example between three and 10 blades, preferably an odd number.

Each blade 13 comprises a cutting leading edge 14 and a trailing edge 15 having the shape of lefthand screws, because of the concavity of the plow disk, but which seem plane in the elevation view in the direction of the axis of rotation 16 of the disk.

Convex leading edges 14 progressively move away from axis 16 in the direction of rotation F1 that the disks adopt when they are driven by the advance of the plow.

In the embodiment shown, trailing edges 15, on the other hand, are concave and the crosswise dimension of each blade 13 decreases between its root zone 17 and its end 18.

Seen in plan as in FIG. 1, edges 14 and 15 can consist of arcs of ellipses, axis 16 being able, for example, to be one of the focal points of the arcs of ellipses 14.

In the variant of FIG. 2, the plow disk according to the invention exhibits a section in the shape of a truncated cone, while in the variant of FIG. 3 it exhibits a section having the shape of a portion of a sphere.

FIG. 4 is a cross-sectional view having a central circular flat portion surrounded by a toroidal surface portion obtained by a torus section by the plane of the flat circular portion where the toroidal portion surrounds the disk. FIG. 5 is similar to FIG. 4 with the toroidal surface portion delimited by two different planes, both of which are perpendicular to the axis. One plane delimits the outer periphery of the disk on one side of the torus while the other plane delimits the connection of the flat circular portion, and is located in the vicinity of the middle of the torus.

The disks described above can be made, for example, by forming or by molding, and have a diameter between 45 cm and 150 cm or more.

A disk set 31 is seen in FIG. 6, mounted integral with a rotation shaft 32.

Shaft 32 is mounted free in rotation on the frame (not shown) of the plow, so as to be inclined in relation to its direction of advance.

Each disk, in the present case, is in the shape of five adjacent blades 13, each blade having its leading edge 14 which progressively moves away from the shaft while turning in the direction of rotation of the disk during its work.

It is seen that two adjacent disks, for example disks 31a and 31b are offset by an angle a which, in the present case, is approximately equal to 18°.

This offsetting of 18°, associated with the fact that the disks comprise five blades, causes the position of the disks on shaft 32 to be identical to itself every four disks, two disks 31a and 31e having the same angular offset being separated by three disks 31b, 31c, and 31d.

Consequently, every 18° of rotation of the set of disks 31, one disk in four attacks the ground, thus rendering the operation of the plow almost without vibration.

Referring to FIG. 2A, this embodiment of discs includes a flat disk a provided with a central bore 16. This flat disk is surrounded by a crown b constituted by a frusto-conical surface. It is clear that a cross section of this disk represented on FIG. 2B is made up of a linear portion perpendicular to the axis, with the linear portion being elongated at its ends by two inclined linear portions corresponding to the frusto-conical surface b.

Referring to FIG. 3A, a portion of a hollow sphere is depicted which has been cut by a plane. The axial cross section of the disk is part of a circle as represented by FIG. 3B.

The third embodiment shown in FIG. 4A shows a central circular flat portion b with the bore 16 for fixing the disk on the shaft. This disk b is surrounded by a toroidal surface portion e obtained by a torus c section by the plane d of the flat circular portion b, where the toroidal portion e surrounds the disk b.

The last embodiment shown in FIG. 5A is similar to the embodiment in FIG. 4A, where the main difference is that the toroidal surface portion e is delimited by two different planes d1 and d2, both of which are perpendicular to the axis. The plane d1 delimits the outer periphery of the disk on one side of the torus while d2 delimits the connection of the flat circular portion b and is located in the vicinity of the middle plane of the torus.

FIGS. 2A–5A cannot show the cuts providing the blades 13 of the disc. The foregoing FIGS. 2–5 are represented by the line II—II on FIG. 1.

I claim:

1. A plow disk for mounting with a plurality of disks of the same nature on a frame of a plow, free in rotation about an axis parallel to the ground, but angled relative to a direction of advance of said plow in order to impart a movement of rotation to said plurality of disks during advance of said plow, each of said disks having a periphery constituted by a plurality of blades each comprising:

a first convex leading cutting edge having an inner extremity directed toward a center of said disk and an outer extremity at said periphery of said disk, a shape of said first convex leading cutting edge being such that when going from said inner extremity to said outer extremity a radial line toward said center of said disk is always moving angularly in a same direction, a second cutting edge adjacent to said first convex leading cutting edge, a shape of which is substantially arcuate with its center located at said center of said disk, the length of said second arcuate cutting edge being substantially shorter than the length of said first convex leading cutting edge, a back concave trailing edge adjacent to said second arcuate cutting edge which is directed substantially in the direction of said center of said disk, the length of said second cutting edge being substantially smaller than a distance between said second cutting edges of two adjacent blades, each blade having a crosswise dimension which decreases while moving away from said axis of rotation, and a position of said disk on said plow being such that a first convex leading cutting edge of each blade is directed toward said direction of advance of said plow when said blade enters the ground.

2. A plow disk according to claim 1, wherein a cross section of the disk in a plane containing the axis of said disk is a central flat portion surrounded by a toroidal surface portion with said central flat portion being perpendicular to the axis of said disk.

3. A plow disk according to claim 2 wherein the periphery and the center of the disk are located substantially in the same plane, perpendicular to the axis of rotation of the disk.

4. A plow disk according to claim 2 wherein the periphery of the disk is located in a plane perpendicular to the axis of the disk which is substantially different from the plane perpendicular to the axis of the disk containing the central part of said disk.

5. A plow disk according to claim 2 wherein the cross section of said disk has substantially the shape of a portion of an arc.

6. A plow disk according to claim 2 wherein the cross section of the disk is substantially the shape of a frusto-conical surface.

7. A disk plow comprises a plurality of disks according to claim 1, said disks being integral with a shaft turning free in rotation around an axis parallel to the ground while being inclined in relation to the direction of advance of the plow.

8. A disk plow according to claim 7, wherein the blades of two adjacent disks are angularly offset by a predetermined value.

9. A disk plow according to claim 8, wherein the blades of two adjacent disks are offset by about 10° to 30°.

10. A disk plow according to claim 7, wherein the blades of two adjacent disks are angularly offset by 15° to 20°.

* * * * *